United States Patent
Scherrbacher et al.

(10) Patent No.: US 7,102,246 B2
(45) Date of Patent: Sep. 5, 2006

(54) METHOD FOR DETECTING SLIP IN GENERATOR AND STARTER-GENERATOR SYSTEMS

(75) Inventors: Klaus Scherrbacher, Reichenbach (DE); Markus Beck, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 323 days.

(21) Appl. No.: 10/276,141

(22) PCT Filed: Feb. 7, 2002

(86) PCT No.: PCT/DE02/00445

§ 371 (c)(1),
(2), (4) Date: Apr. 10, 2003

(87) PCT Pub. No.: WO02/075914

PCT Pub. Date: Sep. 26, 2002

(65) Prior Publication Data

US 2003/0155772 A1 Aug. 21, 2003

(30) Foreign Application Priority Data

Mar. 15, 2001 (DE) .......................... 101 12 568

(51) Int. Cl.
*H02P 9/00* (2006.01)

(52) U.S. Cl. .................. 290/40 R; 290/40 F; 322/22; 322/99

(58) Field of Classification Search ............... 290/40 R, 290/40 F; 123/339.1; 73/118.1; 322/22, 99
See application file for complete search history.

(56) References Cited

U.S. PATENT DOCUMENTS 6,029,512 A * 2/2000 Suganuma et al. ......... 73/118.1

FOREIGN PATENT DOCUMENTS

| JP | 5911028 | * | 7/1984 |
| JP | 10094295 | * | 4/1998 |

* cited by examiner

*Primary Examiner*—Nicholas Ponomarenko
*Assistant Examiner*—Heba Y. M. Elkassabgi
(74) *Attorney, Agent, or Firm*—Michael J. Striker

(57) ABSTRACT

The invention is based on a method for detecting slip in the driving of generator or starter-generator systems. The alternators of these systems are equipped with electronic control components such as pulse-width-modulated inverters or rectifier bridges. The drive torque of the alternator is transferred to this by means of a belt drive of an internal combustion engine. When slip is detected in a comparison step (3), to which speed-dependent input variables (1, 2) are forwarded, the maximum transferrable drive torque is determined in a torque limiting step (18, 20), and a closed-loop control (23) adjusts the generator output power to said maximum transferrable drive torque.

11 Claims, 1 Drawing Sheet

METHOD FOR DETECTING SLIP IN GENERATOR AND STARTER-GENERATOR SYSTEMS

TECHNICAL BACKGROUND

Alternators installed in motor vehicles are driven directly by the vehicle engine. The driving is generally realized with belt drives. High requirements in terms of force transmission are placed on belt drives, whether they are V-belts or ribbed V-belts. The belt material must have extensive bending strength. Moreover, the linear extensional strain over the course of ageing must be as minimal as possible in order to prevent slip—combined with excessive heating-up and wear—of the belt.

BACKGROUND OF THE INVENTION

Alternators that are driven via normal V-belts by the internal combustion engine are secured almost exclusively with a swivel arm. If the swivel arm is situated such that it can turn around a rocker pivot, the V-belt tension can be readjusted and retensioned accordingly by swiveling the generator if the belt becomes stretched. The V-belt is usually readjusted at certain inspection intervals or when the V-belt can be heard slipping on the belt pulley.

An alternator in motor vehicles can also be driven by ribbed V-belts (poly-V-belts). In this drive variant, the alternator is securely mounted on the engine block. The tension required for driving and to be applied to the belt is applied by means of a belt tensioner, e.g., designed as a belt tensioner that can be adjusted on the back of the belt.

Depending on the size of the alternator to be driven, one or two belts are required for driving, so that two belt tensioners capable of being adjusted on the back of the belt are required to set the required belt tension, which said belt tensioners must be adjusted separately depending on the lengthening if the belt tension required to transfer torque becomes insufficient and slip occurs between the belt and the belt pulley.

In the case of alternators used today in motor vehicles, such as claw-pole alternators, high drive torques to be transferred occur due to the high generator output powers that can be obtained by using electronic generator control components in the generator. The high drive torques to be transferred can lead to impermissibly high slip at the belt drive, which absolutely must be prevented, but at least limited since belt wear is at a maximum in this state. As described hereinabove, in the case of previous means of attaining the object, the slip that occurs can be eliminated only by making adjustments at the rocker pivot of the alternator or by making adjustments to the belt tensioners to be tensioned on the backs of each belt, either by taking the vehicle to workshop or by the driver himself, provided he has the proper tool on hand.

SUMMARY OF THE INVENTION

By means of the method proposed according to the invention, the service life of a belt drive can be extended significantly, and the high levels of noise emissions that occur between the belt and the belt pulley driving the alternator when slip is present are reliably prevented. This is obtained by the fact that the generator output power is reduced during an operating phase of the motor vehicle—which is characterized by high speed dynamics, for example—and, as a result, the drive torque to be applied on the drive side of the alternator decreases. Additionally, the generator output power is reduced via the alternator closed-loop control when the instantaneous value of the slip s exceeds the maximum permissible slip value $s_{max}$.

If an instantaneous slip s that exceeds the maximum slip value $s_{max}$ is detected, an initial reduction of the maximum permissible drive torque of the alternator takes place by limiting the generator output power. If an acceleration phase of the internal combustion engine also occurs during this operating phase, its rotational speed also increases greatly, [and] the maximum permissible, reduced drive torque for the alternator determined in the first limiting step can be reduced once more by means of a further limiting step. In particular, this inhibits a noise emission occuring in acceleration phases when a belt slips through and that is perceived as very unpleasant.

The event that occurs—the slipping-through of the alternator drive belt in motor vehicles caused by slip—can be documented with an entry in a fault memory. This event can also be communicated to the vehicle driver by means of a display in the instrument panel.

In addition to reducing generator output power in phases of high speed dynamics to an output power that suffices to ensure that all equipment in the motor vehicle is supplied, the generator output power can be limited via the status bit over the entire driving cycle—e.g., a long-distance trip—in such a fashion that the remaining service life of the belt is increased until help can be obtained.

With the method proposed according to the invention, a cause of breakdowns that occurs frequently according to regularly-compiled breakdown statistics—i.e., torn V-belts—can be prevented, since a plurality of add-on components on internal combustion engines, such as fans, water pump, power-steering pump and the like are usually driven by means of a belt drive.

BRIEF DESCRIPTION OF THE DRAWINGS

The invention is described in greater detail with reference to drawings.

DETAILED DESCRIPTION OF THE PREFERRED EMBODIMENTS

Figure 1:
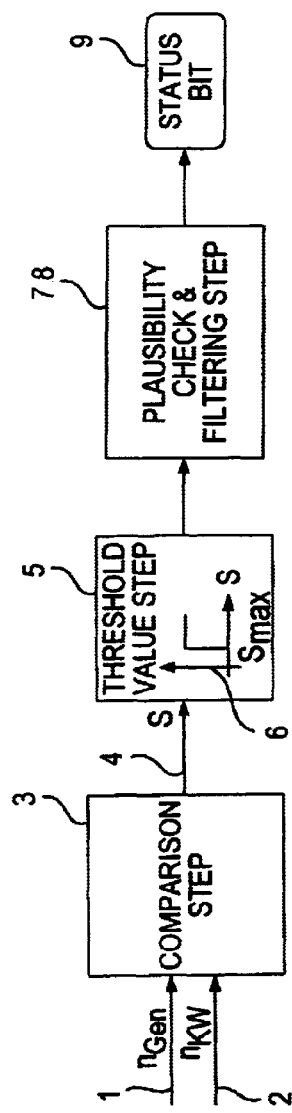
FIG. 1 shows the generation of a status bit that displays the occurrence of slip and that is capable of being processed further.

FIG. 1 shows the generation of a status bit that displays the occurrence of slip and that is capable of being processed further.

As indicated in the illustration according to FIG. 1, two input variables 1, 2 are forwarded to a comparison step 3. Input variable 1 represents the rotational speed of the alternator $n_{Gen}$. Input variable 2 represents the instantaneous crankshaft rotational speed $n_{KW}$ of the internal combustion engine that drives the alternator. Input variable 2 is picked off by a communication interface of the vehicle electronics and it is picked off in cyclic fashion by a speed sensor, so that instantaneous value of the rotational speed of the internal combustion engine present at the comparison step 3 is always current. In the comparison step shown in FIG. 1 as a schematic representation only, the actual instantaneous slip value 4 s is calculated according to the relationship:

$$\frac{(n_{kw} \cdot \ddot{u} - n_{Gen})}{n_{kw} \cdot \ddot{u}} = s$$

with ü=pulley ratio.

The output value for the instantaneous slip 4 s determined in the comparison step 3 that was determined according to the relationship shown hereinabove is forwarded to a threshold value step 5. A freely specifiable maximum slip value $s_{max}$ is stored in the threshold value step 5. In the threshold value step 5, it can be determined whether the values for the instantaneous slip 4 s transmitted continuously by the comparison step 3 are above the maximum permissible slip value $s_{max}$ stored in the threshold value step 5.

If the instantaneously determined value of the slip 4 s exceeds the maximum slip value $s_{max}$ stored in the threshold value step 5, this value is investigated for its plausibility and chronologically filtered in a plausibility-check and filtering step 7, 8. After the plausibility-check and filtering step 7, 8 is passed, its output variable is a status bit that contains the event: "instantaneous slip 4 s is occurring that exceeds the maximum permissible slip value $s_{max}$". This status bit 9 can be entered in a fault memory.

Figure 2:
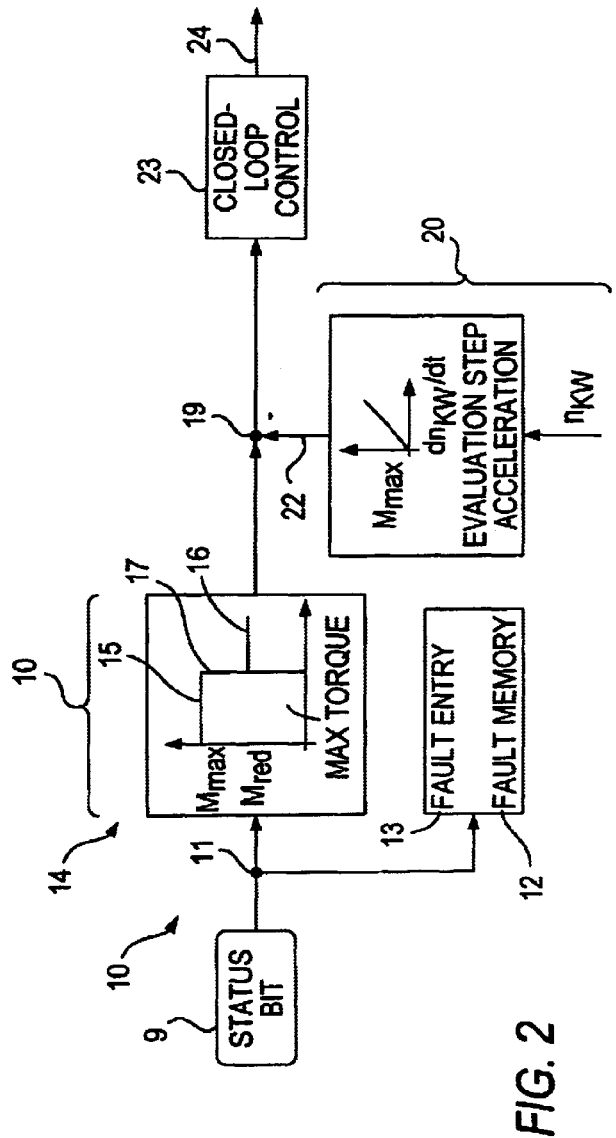
FIG. 2 shows the further processing of the generated status bit that displays slip as an input signal for limiting the drive torque of the alternator.

The further processing of the generated status bit for instantaneously occurring slip that is used as a triggering signal to limit the drive torque of the alternator is shown in FIG. 2.

Before being transmitted to a first limiting step for the drive torque of the alternator, the status bit 9 is picked off at a branch 11 and entered as a fault entry 13 in a fault memory 12. The fault memory 12 itself can be read out via a diagnostics device in a workshop, where the necessary actions can be taken to rectify the impermissibly high slip occurring in the belt drive. It is also possible to use the status bit 9 to notify the driver of the presence of an impermissibly high slip in a display in the instrument panel of the vehicle, so that said driver can rectify the problem himself if possible.

In a first limiting step 18 to limit the drive torque of the alternator, a torque limitation 14 of the maximum torque 15 to a reduced torque 16 takes place. The transition from the maximum torque 15 to the reduced torque 16 is indicated by a torque jump ΔM in the illustration according to FIG. 2. This torque jump is triggered by the status bit 9, so that a variable is obtained by means of the first limiting step 18 for the drive torque of the alternator at a summing point 19 downstream from the torque limitation 14, which said variable represents a reduced torque 16 for the driving of the alternator.

The output variable present at the summing point 19 after the first limiting step 18 represents a value for the reduced torque 16 with which the alternator can be driven if the maximum slip value 6 $s_{max}$ is exceeded, so that the instantaneous slip value 4 s drops below the maximum slip value 6 $s_{max}$. A limiting step is indicated by reference numeral 20, the output variable 22 of which is forwarded, with a sign, to the heretofore-mentioned summing point 19. By means of the second limiting step 20, the variable—that corresponds to the reduced drive torque 16 of the alternator—forwarded to the summing point 19 at first limiting step 18 on the output side can be reduced once more. On the input side, the second limiting step 20 is acted upon by the input variable 2 $n_{KW}$ representing the instantaneous speed 2 of the internal combustion engine. In the second limiting step 20, the respective instantaneous speed 2 of the internal combustion engine is evaluated so as to detect an acceleration phase in which a slipping-through of the V-belt on the alternator is make obvious by a loud squealing noise. For this purpose, the input variable 2, which represents the instantaneous rotational speed of the internal combustion engine, is chronologically differentiated, and an input variable 22 is generated that has a negative sign and is forwarded to the aforementioned summing point 19. The input variable of the second limiting step 20 represents a variable by which the drive torque of the alternator must be further reduced in order to prevent the slipping belt from slipping through on the alternator in this unfavorable operating state. By means of the second limiting step 20, the coincidence of unfavorable operating states is taken account to the extent that the occurrence of instantaneous slip 4 s itself, as well as the rotational speed behavior of the internal combustion engine during an acceleration phase are taken into consideration in the determination of the maximum permissible drive torque for the alternator at the summing point 19 by means of appropriate proportions.

A variable for the drive torque of the alternator reduced via the first limiting step 18 and the second limiting step 20 is therefore present at the summing point 19, which said variable can be forwarded as an input variable to the closed-loop control 23 of the alternator. Using this input value, representing a drive torque variable reduced one or two-fold, the generator output power can be limited and the transferrable drive torque—transferred by the belt drive—can be adjusted. As a result, on the one hand, the drive torque to be transferred can be adjusted for the service life of the belt with slippage, so that the service life of the belt can be extended, and, on the other hand, the noise emission produced by belts slipping through on the pulley—whether they are open-flank belts or belts with ribbed "V" cross-sections—can be prevented. A limiting of the generator output power can be activated, but this is not absolutely necessary, since the electrical components required in the motor vehicle can be supplied for a short period of time by the automotive battery present in the motor vehicle.

| Reference Numerals | |
|---|---|
| 1 | Input variable alternator speed $n_{Gen}$ |
| 2 | Input variable crankshaft rotational speed $n_{KW}$ |
| 3 | Comparison step |
| 4 | Output variable slip s |
| 5 | Threshold value step |
| 6 | Maximum slip value $s_{max}$ |
| 7 | Plausibility-check step |
| 8 | Filtering step |
| 9 | Output variable status bit |
| 10 | Signal further processing |
| 11 | Branch |
| 12 | Fault memory |
| 13 | Fault entry |
| 14 | Torque limiting |
| 15 | Maximum torque |
| 16 | Reduced torque |
| 17 | Torque jump ΔM |
| 18 | First limiting step |
| 19 | Summing point |
| 20 | Second limiting step |
| 21 | Evaluation step acceleration d $n_{KW}$/dt |
| 22 | Output variable |
| 23 | Closed-loop control of alternator to reduced drive torque |
| 24 | Reduced output power |

What is claimed is:

1. A method for detecting slip (4) in the driving of rotary current generators that are controlled with an electronic machine control such as a pulse-width-modulated inverter or a rectifier, and with which a drive torque of an internal combustion engine is transferred to the rotary current generator via a belt drive, wherein, in a comparison step (3), speed-dependent input variables (1, 2) are forwarded, wherein, with detection of slip (4), a signal (9) is generated, wherein based on the signal, a maximum transferrable drive torque is set in a first torque limiting step (18, 20) to reduced torque (16), and in the event of an acceleration phase of the internal combustion engine, the reduced torque (16) is reduced additionally in a second torque limiting step, and output variables (16, 22) of the torque limiting steps (18, 20) are combined at a summing point (19), and the resulting signal at the summing point (19) is supplied to a closed-loop control (23) for limiting the generator output power.

2. The method according to claim 1, wherein the input variables are an alternator speed (1) $n_{Gen}$ and a rotational speed of the crankshaft of the internal combustion engine (2) $n_{KW}$.

3. The method according to claim 2, wherein the slip (4) s is determined in the comparison step (3) according to the relationship $$\frac{(n_{kw} \cdot \ddot{u} - n_{Gen})}{n_{kw} \cdot \ddot{u}} = s$$

with $\ddot{u}$=pulley ratio.

4. The method according to claim 1, wherein an instantaneous slip value (4) s is checked if it exceeds a maximum permissible, pre-settable slip value (6) s.

5. The method according to claim 4, wherein, when the maximum permissible slip value (6) $s_{max}$ is exceeded, the determined instantaneous slip (4) s is chronologically filtered and checked for plausibility, and a status bit (9) is set as the signal.

6. The method according to claim 5, wherein the status bit (9) is entered as a fault entry (13) in a fault memory (12) that can be read out via a diagnostics unit.

7. The method according to claim 1, wherein, depending on the signal (9), the maximum permissible torque (15) is set to a reduced torque (16) in a first speed limiting step (18).

8. The method according to claim 7, wherein, during an acceleration phase of the internal combustion engine $$\left(\frac{dn_{kw}}{dt}\right) > 0,$$

the reduced torque (16) of a second limiting step (20) is also limited.

9. The method according to claim 7, wherein the output variable (16) of the first torque limiting step (18) and the output variable (22) of the second torque limiting step (20) are combined at a summing point (19).

10. The method according to claim 9, wherein the output variable (16) and the output variable (22), with signs, are added at a summing point (19).

11. The method according to claim 9, wherein the variable resulting at the summing point (19) represents the reduced, maximum permissible drive torque of the alternator to which the generator output power is adjusted via a closed-loop control (23).

* * * * *